(12) United States Patent
Zheng et al.

(10) Patent No.: US 11,909,340 B2
(45) Date of Patent: Feb. 20, 2024

(54) MOTOR VIBRATION METHOD, MOTOR VIBRATION DEVICE, COMPUTER DEVICE, AND COMPUTER-READABLE STORAGE MEDIUM

(71) Applicant: AAC Technologies Pte. Ltd., Singapore (SG)

(72) Inventors: Yajun Zheng, Shenzhen (CN); Yulei Zhang, Shenzhen (CN); Chengyan Sang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 814 days.

(21) Appl. No.: 16/994,707

(22) Filed: Aug. 17, 2020

(65) Prior Publication Data

US 2021/0036644 A1 Feb. 4, 2021

Related U.S. Application Data

(63) Continuation of application No. PCT/CN2019/093913, filed on Jun. 28, 2019.

(51) Int. Cl.
*H02P 25/032* (2016.01)
*G10L 25/18* (2013.01)
*G10L 25/51* (2013.01)
*H01H 3/00* (2006.01)

(52) U.S. Cl.
CPC ............ *H02P 25/032* (2016.02); *G10L 25/18* (2013.01); *G10L 25/51* (2013.01); *H01H 2003/008* (2013.01)

(58) Field of Classification Search
CPC ........ H02P 25/032; G10L 25/18; G10L 25/51; A61B 2018/00303; Y10T 74/2195; H04R 2400/03; H01H 2003/008
See application file for complete search history.

(56) References Cited

U.S. PATENT DOCUMENTS

| 2011/0075835 A1* | 3/2011 | Hill | G06F 3/016 340/407.1 |
| 2017/0236388 A1* | 8/2017 | Hill | H04M 19/04 340/407.1 |
| 2018/0123494 A1* | 5/2018 | Xie | H02P 25/032 |

FOREIGN PATENT DOCUMENTS

CN 107370899 A * 11/2017 .......... H04M 19/047

* cited by examiner

*Primary Examiner* — Bickey Dhakal
(74) *Attorney, Agent, or Firm* — W&G Law Group (57) ABSTRACT

A motor vibration method and a motor vibration device are provided. The motor vibration method includes: receiving a vibration instruction, and acquiring target environmental data by a preset sensor, wherein the target environmental data includes one or more of environmental noise data, acceleration data and/or pressure data; determining a first vibration signal according to the target environmental data; generating a target vibration signal according to the first vibration signal and a preset second vibration signal, wherein a first frequency of the first vibration signal is greater than a second frequency of the second vibration signal; and controlling the motor to vibrate according to the target vibration signal. The method combines a traditional vibration reminding effect and a sound reminding effect provided by adding the medium- and high-frequency signal, thereby enhancing the reminding efficiency by means of motor vibration and increasing the successful rate of message delivery.

7 Claims, 5 Drawing Sheets

MOTOR VIBRATION METHOD, MOTOR VIBRATION DEVICE, COMPUTER DEVICE, AND COMPUTER-READABLE STORAGE MEDIUM

CROSS REFERENCE TO RELATED APPLICATIONS

This non-provisional patent application is a continuation application of International Application PCT/CN2019/093913, filed on Jun. 28, 2019, the content of which is incorporated herein by reference.

TECHNICAL FIELD

The present disclosure relates to the field of electronic devices, in particular to a motor vibration method, a motor vibration device, a computer device, and a computer-readable storage medium.

BACKGROUND

The continuous development of mobile communication and electronics technology has led to a wide application and popularization of portable electronic devices such as smartphones. When one of such portable electronic devices, such as the smartphone, is used, it is necessary to send messages and to remind the user of new messages. However, the user often needs to be informed and reminded of new messages on the smartphone without ringing because the user is in a specific occasion or environment, such as in a library or a meeting. In the related art, a common approach is to switch the device to a vibration mode, in which the user is reminded of new messages by a vibrating sensation caused by a motor installed in the device.

However, such an approach has drawbacks. When the device, such as the smartphone, is placed on a desk or in a pocket of the user, the smartphone is not in direct contact with the body of the user. In this case, the reminding effect of vibrations may be greatly reduced due to the failure of the user to sense the vibrations of the device, and consequentially, the user may miss the new messages, thus delaying a series of relevant activities and causing losses.

SUMMARY

Accordingly, embodiments of the present disclosure are directed to a motor vibration method, a motor vibration device, a computer device, and a computer-readable storage medium.

In one independent aspect, a motor vibration method is provided which includes: receiving a vibration instruction, and acquiring target environmental data by a preset sensor, wherein the target environmental data includes one or more of environmental noise data, acceleration data and/or pressure data; determining a first vibration signal according to the target environmental data; generating a target vibration signal according to the first vibration signal and a preset second vibration signal, wherein a first frequency of the first vibration signal is greater than a second frequency of the second vibration signal; and controlling the motor to vibrate according to the target vibration signal.

In some embodiments, determining the first vibration signal according to the target environmental data includes: extracting environmental noise spectral features from the environmental noise data; determining an environmental noise center frequency corresponding to the environmental noise data according to the environmental noise spectral features; and determining a vibration frequency corresponding to the environmental noise center frequency as the first frequency of the first vibration signal according to a preset mapping relation between noise frequencies and vibration frequencies.

In some embodiments, determining the first vibration signal according to the target environmental data includes: acquiring an environmental noise sound pressure value in the environmental noise data; determining an environmental noise sound pressure level corresponding to the environmental noise sound pressure value; and determining a signal amplitude corresponding to the environmental noise sound pressure level as a first amplitude of the first vibration signal according to a preset mapping relation between noise sound pressure levels and signal amplitudes.

In some embodiments, determining the first vibration signal according to the target environmental data includes: inputting the target environmental data into a preset environment classification model to acquire a target device status and a target scenario type as outputs of the environment classification model; and correcting the first vibration signal according to the target device status and the target scenario type.

In some embodiments, correcting the first vibration signal according to the target device status and the target scenario type includes: determining a first correction value and a second correction value according to the target device status and the target scenario type; and correcting a first vibration frequency and a first amplitude of the first vibration signal according to the first correction value and the second correction value.

In some embodiments, determining the target vibration signal according to the first vibration signal and the preset second vibration signal includes: acquiring a vibration signal with a preset second frequency and a preset second amplitude to serve as the second vibration signal; and superposing the first vibration signal and the second vibration signal to generate the target vibration signal.

In some embodiments, the motor vibration method further includes: determining a sample set, wherein the sample set includes multiple environmental data samples and sample reference results corresponding to the environmental data samples, and each of the sample reference results includes a device status and/or a scenario type; and training a preset environment classification model with the environmental data samples as inputs and the sample reference results as outputs.

In another independent aspect, a motor vibration device is provided which includes an acquisition unit, a determination unit, a generation unit, and a vibration unit. The acquisition unit is configured for receiving a vibration instruction and acquiring target environmental data by a preset sensor, wherein the target environmental data includes one or more of environmental noise data, acceleration data and/or pressure data. The determination unit is configured for determining a first vibration signal according to the target environmental data. The generation unit is configured for generating a target vibration signal according to the first vibration signal and a preset second vibration signal, wherein a first frequency of the first vibration signal is greater than a second frequency of the second vibration signal. The vibration unit is configured for controlling the motor to vibrate according to the target vibration signal.

In another independent aspect, a computer-readable storage medium is provided which has a computer program stored thereon. The computer program is executable by a processor to implement a motor vibration method. The motor vibration method includes: receiving a vibration instruction, and acquiring target environmental data by a preset sensor, wherein the target environmental data includes one or more of environmental noise data, acceleration data and/or pressure data; determining a first vibration signal according to the target environmental data; generating a target vibration signal according to the first vibration signal and a preset second vibration signal, wherein a first frequency of the first vibration signal is greater than a second frequency of the second vibration signal; and controlling the motor to vibrate according to the target vibration signal.

In still another independent aspect, a computer terminal includes a processor and a memory in communication with the processor. The memory has a computer program stored thereon, and the computer program is executable by the processor to implement a motor vibration method, the motor vibration method including: receiving a vibration instruction, and acquiring target environmental data by a preset sensor, wherein the target environmental data includes one or more of environmental noise data, acceleration data and/or pressure data; determining a first vibration signal according to the target environmental data; generating a target vibration signal according to the first vibration signal and a preset second vibration signal, wherein a first frequency of the first vibration signal is greater than a second frequency of the second vibration signal; and controlling the motor to vibrate according to the target vibration signal.

Upon receiving a vibration instruction for providing a reminder on a portable terminal device such as, a mobile phone, a suitable medium- and high-frequency vibration signal that corresponds to a current device status and application scene is determined based on environmental data acquired by a sensor disposed in the terminal device. The medium- and high-frequency vibration signal is superposed on a preset common low-frequency vibration signal to obtain a target motor vibration signal which is used to drive the motor to vibrate. Therefore, the motor produces vibration and sound simultaneously. Different from the motor vibration method in the related art in which a single low-frequency vibration signal to which human ears is insensitive is usually used to drive the motor to vibrate, and the user is reminded of new messages by means of vibrating sensation only, embodiments of the present disclosure combine the traditional vibration reminding effect and a sound reminding effect provided by adding the medium- and high-frequency signal, thereby addressing the problem that the user cannot sense the motor vibration in some application scenarios and hence enhancing the reminding efficiency by means of motor vibration and increasing the successful rate of message delivery.

Independent features and/or independent advantages of this disclosure may become apparent to those skilled in the art upon review of the detailed description, claims and drawings.

DESCRIPTION OF THE EMBODIMENTS

Embodiments of the present disclosure will be described in detail below with reference to FIG. 1 through FIG. 9.

In the related art, the motor is driven to vibrate by a single low-frequency vibration signal to which human ears are insensitive, and the user is reminded of a new message by means of the vibrating sensation only. However, the user cannot feel the motor vibration in some application scenarios. To solve this problem, embodiments of the present disclosure provide an improved motor vibration method. In the improved motor vibration method, a medium- and high-frequency signal, which can be used to generate a sound at a frequency to which human ears are sensitive, is added into the original vibration signal of the motor, and the medium- and high-frequency signal is determined according to data of the environment where a user is located. As such, both sound and vibrating sensation are produced to remind the users. The method may be implemented based on a terminal device, such as a mobile phone, a tablet computer or other portable intelligent electronic devices including the motor. When vibrations are needed, a processor generates a vibration signal, and then the motor is controlled to vibrate to realize reminding and notification effects.

Figure 1:
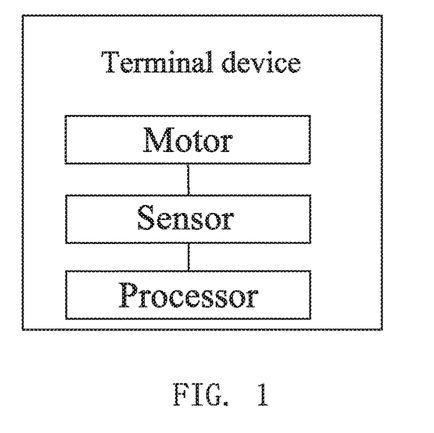
FIG. 1 is a block diagram illustrating an application environment for a motor vibration method according to one embodiment.

The motor vibration method described above can be implemented based on a terminal device shown in FIG. 1. The terminal device includes a processor and a motor. To further improve the effectiveness and accuracy of vibration reminding of the motor, the environment in which the terminal device is located is also taken into consideration in this embodiment. Hence, the terminal device in this embodiment further includes a sensor device used for acquiring environmental data.

Considering that the vibrating sensation and sounds generated by vibrations of the motor are generally used to remind the user of a preset device including the motor of a new message or an emergency of a specific type, the preset device is typically an intelligent portable electronic device with processing and memory capacities, such as a smartphone or a tablet computer. The intelligent electronic device can send a corresponding vibration instruction to the motor arranged therein when a specific type of event occurs or a preset activity is triggered. Hence, the method of the present disclosure is exemplarily described to be implemented on a portable terminal such as a smartphone, and the implementation process is shown in FIG. 2.

Figure 2:
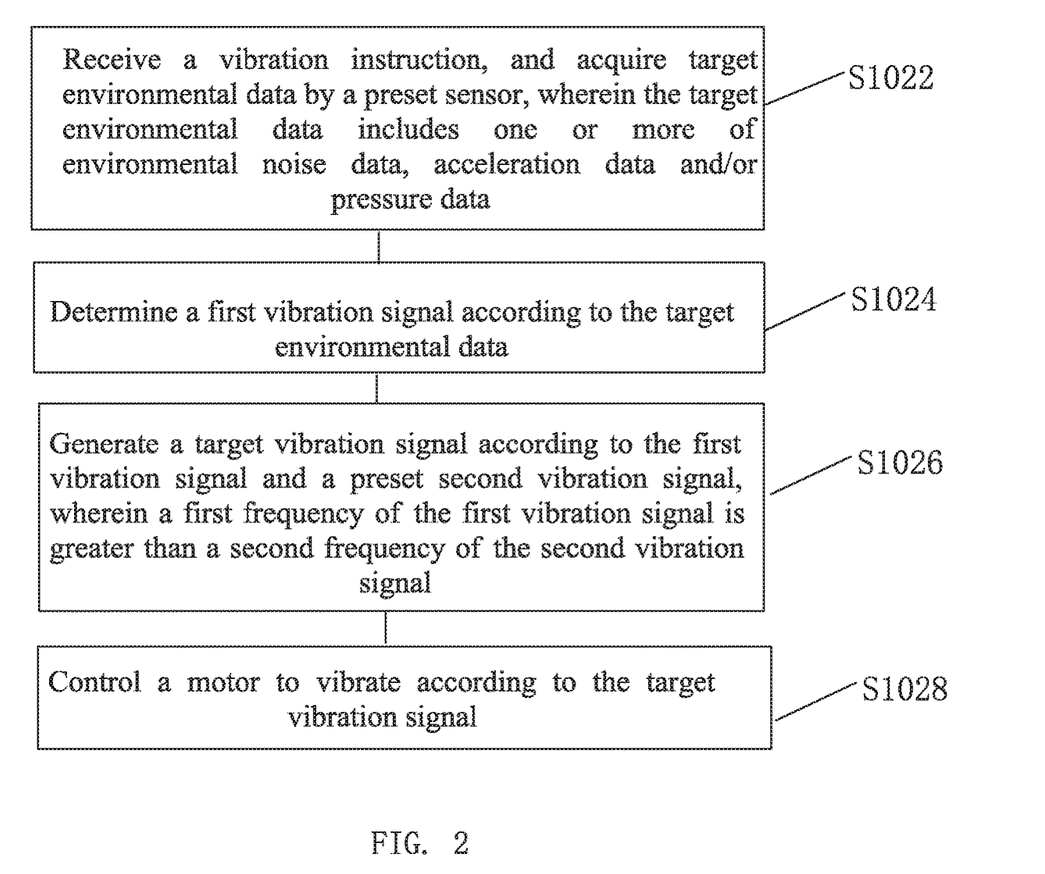
FIG. 2 is a flowchart of a motor vibration method according to one embodiment.

FIG. 2 is a flowchart of the motor vibration method in accordance with one embodiment of the present disclosure.

The implementation process of the motor vibration method of the present disclosure may at least include Steps S1022-S1028 shown in FIG. 2. These steps are specifically explained below with reference to FIG. 2.

At Step S1022, a vibration instruction is received, and target environmental data is acquired by a preset sensor, wherein the target environmental data includes one or more of environmental noise data, acceleration data, and/or pressure data.

Specifically, the environmental noise data may be acquired by a microphone of the terminal, the acceleration data may be acquired by an acceleration sensor of the terminal, and the pressure data may be acquired by a pressure sensor of the terminal.

The acceleration data and the pressure data can correspondingly reflect the current status of the device. For example, when the mobile phone moves from being held by a user's hand to being placed flat on a desk or in a pocket, the acceleration and pressure fed back by the sensors will dynamically change, accordingly.

At Step S1024, a first vibration signal is determined according to the target environmental data.

Specifically, determining the first vibration signal according to the target environmental data includes determining a first frequency of the first vibration signal according to the target environmental data. The specific process at least includes Steps S1032-S1036 shown in FIG. 3. These steps are specifically explained below.

Figure 3:
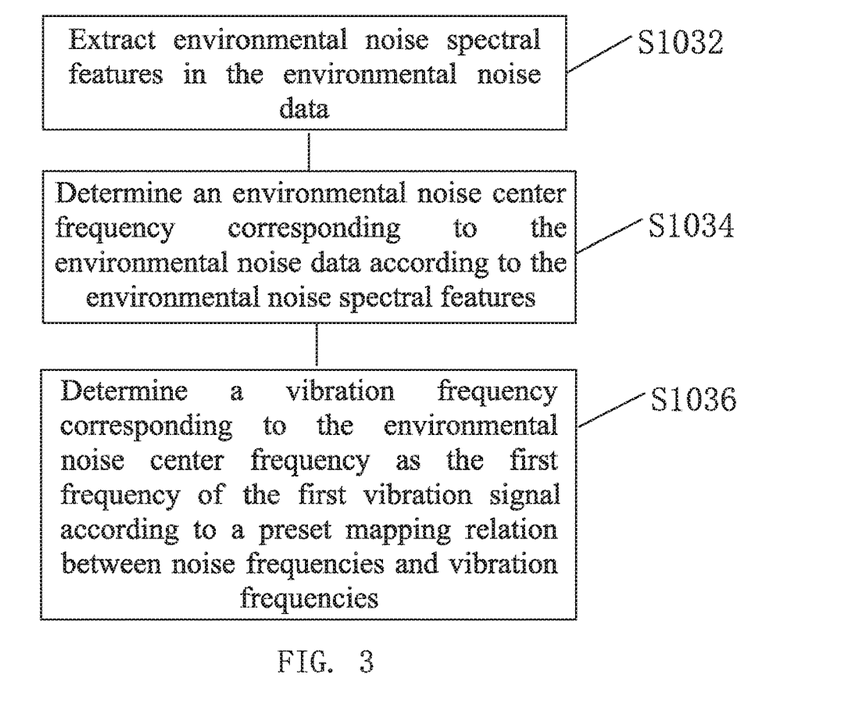
FIG. 3 is a flowchart of the process of determining a first frequency of a first vibration signal according to environmental noise data in the motor vibration method according to one embodiment.

FIG. 3 is a flowchart of the process of determining the first frequency of the first vibration signal according to the environmental noise data in the motor vibration method according to one embodiment.

At Step S1032, environmental noise spectral features in the environmental noise data are extracted.

Specifically, after a sound pressure value of environmental noise (namely a parameter indicative of the level of sounds sensed by human ears) is acquired by the microphone, the corresponding spectral features of the environmental noise can be extracted by a preset transform (such as Fourier transform) processing.

At Step S1034, an environmental noise center frequency corresponding to the environmental noise data is determined according to the environmental noise spectral features.

The frequency range of the environmental noise can be determined according to an environmental noise frequency distribution reflected by the environmental noise spectral features, and the median of the frequency range is obtained to determine the center frequency of the environmental noise.

Here, the center frequency of the environmental noise is determined for the following reasons and advantages: upon the center frequency of the environmental noise being determined, the background noise of the user can be determined and serve as a reference for sound reminding by means of motor vibration. That is, the vibration frequency of the medium- and high-frequency first vibration signal used for vibration-based sound producing is designed to be different from the center frequency of the environmental noise, so that the frequency of sounds produced by vibrations of the motor in different noise environments can be obviously different from the frequency of background environmental noise. As such, the sounds produced by the motor vibration can be more easily recognized and noticed, thus realizing a reminding effect.

At Step S1036, a vibration frequency corresponding to the environmental noise center frequency is determined as a first frequency of the first vibration signal according to a preset mapping relation between environmental noise center frequencies and vibration frequencies.

Specifically, the first frequency of the first vibration signal can be determined according to a preset frequency range mapping relation between noise spectral features and vibration frequencies. For example, when the mobile phone is placed flat on a desk, the frequency of the environmental noise may be classified into (0 Hz, 2500 Hz] or (2500 Hz, +∞) by spatial (frequency range) mapping according to the acquired environmental noise spectral features. When the determined environmental noise center frequency is within (0 Hz, 2500 Hz], the frequency of the medium- and high-electrical signal for sound produced by vibrations can be set to be higher than 2500 Hz, such as 3000 Hz, which can serve as the first frequency of the first vibration signal. Similarly, when the environmental noise center frequency is within (2500 Hz, +∞), the first frequency of the first vibration signal can be determined as 2000 Hz.

In addition, optionally, the vibration frequency corresponding to the environmental noise center frequency can be mapped out according to a preset function expression. That is, the present disclosure has no limits in the manner of mapping between the noise spectral features and the vibration frequencies.

Figure 4:
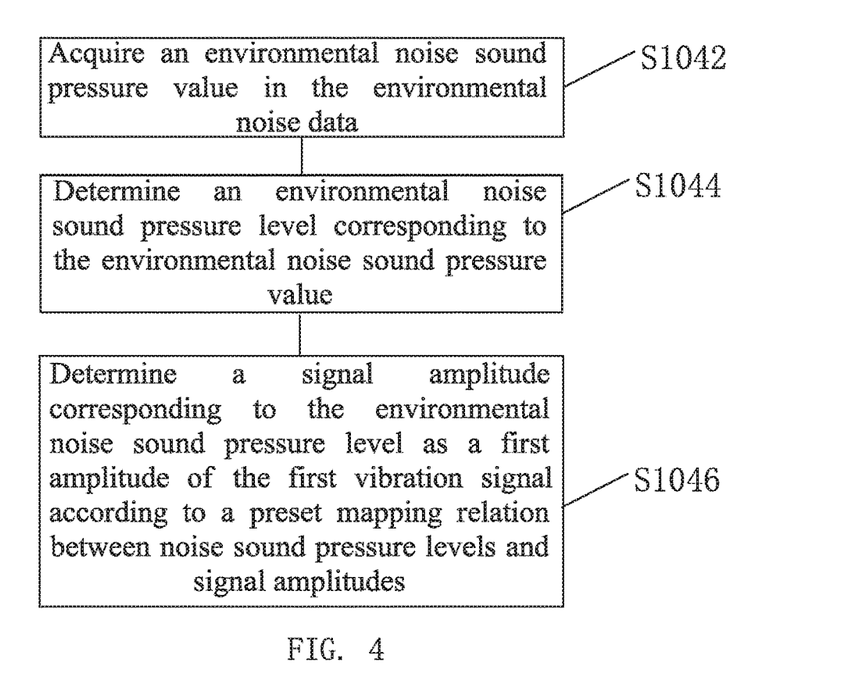
FIG. 4 is a flowchart of the process of determining a first amplitude of a first vibration signal according to environmental noise data in the motor vibration method according to one embodiment.

After the first frequency is determined, a first amplitude of a first target signal may be further determined through Steps S1042-S1046 shown in FIG. 4. These steps are specifically explained below.

FIG. 4 is a flowchart of the process of determining the first amplitude of the first vibration signal according to the environmental noise data in the motor vibration method.

At Step S1042, an environmental noise sound pressure value in the environmental noise data is acquired.

In a specific embodiment, the environmental noise sound pressure value may be acquired in real-time by the microphone of the device and can directly indicate the volume of sounds sensed by human ears.

At Step S1044, an environmental noise sound pressure level corresponding to the environmental noise sound pressure value is determined.

Specifically, when the environmental noise sound pressure value is Pe and a preset reference sound pressure value is Pref, the corresponding environmental noise sound pressure level (SPL) (by decibel) is determined as:

$$SPL = 20 \lg(Pe/\text{Pref})$$

At Step S1046, a signal amplitude corresponding to the environmental noise sound pressure level is determined as the first amplitude of the first vibration signal according to a preset mapping relation between environmental noise sound pressure levels and signal amplitudes.

Specifically, the amplitude of the medium- and high-frequency electrical signal for sound produced by vibrations can be calculated according to the sound pressure level through, but not limited to, range mapping and functional expression. In an optional embodiment, which is described in conjunction with the same example of the mobile phone being placed flat on a desk, if a spatial mapping is adopted, the sound pressure levels of the environmental noise include (0 dB, 30 dB], (30 dB, 50 dB], (50 dB, 80 dB] and (80 dB, +∞) (in actual application, the four sound pressure levels may respectively correspond to a quiet environment, a normal conversation environment, a noisy environment such as kitchen or television environment, a busy street or even noisier environment where the mobile phone is used), and signal amplitudes that can be mapped out according to the four sound pressure levels are set as 2, 4, 6, and 8, respectively.

For example, upon determining that the sound pressure level of the environmental noise is within (30 dB, 50 dB], it can be determined that the user is using the mobile phone in a relatively quiet environment in which a few people are talking at a normal sound volume at present, and in this case, the signal amplitude of the vibration signal is 4 according to the preset spatial mapping relation.

Similarly, in a specific embodiment, it should be noted that the signal amplitude required for the first vibration signal corresponding to the sound pressure level can also be determined by the mapping of two associated parameters such as by a preset function expression, instead of by the mapping relation.

Furthermore, different sounds and vibrating sensations need to be generated by vibrations of the motor in the device to remind the user when the device, such as the smartphone, is in different statuses (such as being held in hand, placed flat, placed in a pocket, or the like) and the user is in different scenarios (such as in the quite environment, in the normal conversation environment, or in the busy and noisy street environment) in actual applications. For example, the vibrating sensation and sound intensity required when the mobile phone is held by user's hand in the quiet environment may be smaller than those required to fulfill the same reminding effect when the mobile phone is placed in the pocket of the user in the busy and noisy street environment. Therefore, parameters relating to the vibrating sensation and sound intensity generated by the vibration signal, such as the frequency and amplitude of the vibration signal, should be corrected to a certain degree (increased or decreased in proportion) according to the specific application scenario and device status to ensure that a vibration signal which is most suitable for the current device status and environmental scenario is generated. Because of this, in one optional embodiment of the present disclosure, the device status and the scenario type corresponding to the environmental noise may further be determined according to the target environmental data to further correct the first frequency and the first amplitude of the first vibration signal to ensure a better vibration reminding effect by means of motor vibration.

Figure 5:
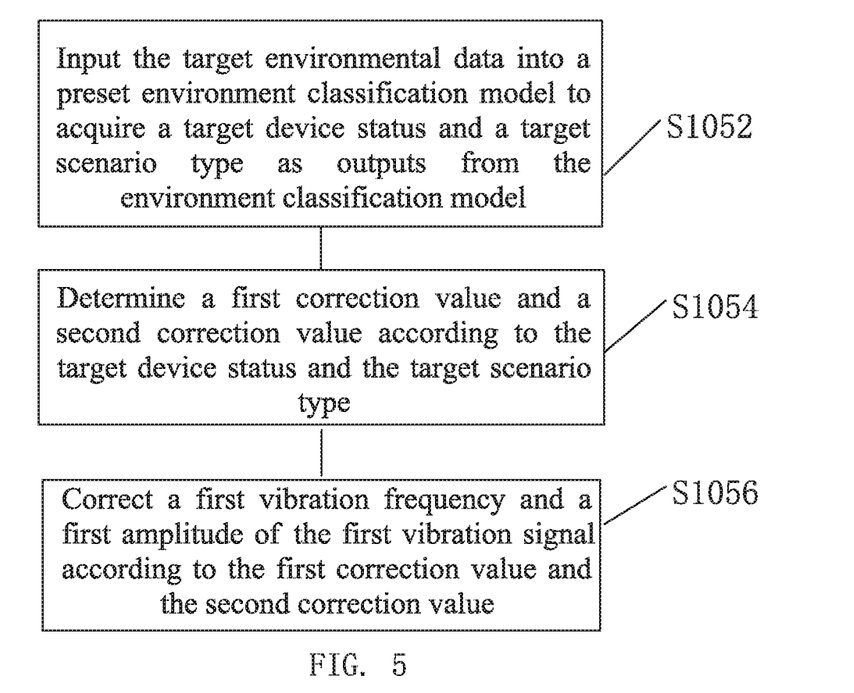
FIG. 5 is a flowchart of the process of correcting a first vibration signal in the motor vibration method according to one embodiment.

Specifically, the first vibration signal can be corrected through Steps S1052-S1056 shown in FIG. 5.

FIG. 5 is a flowchart of correcting the first vibration signal in the motor vibration method according to another embodiment.

At Step S1052, the target environment data is input into a preset environment classification model to obtain a target device status and a target scenario type as outputs from the environment classification model.

In an optional embodiment, the preset environment classification model can be trained to improve the classification accuracy of the model as follows.

A sample set is determined, wherein the sample set includes multiple environmental data samples and sample reference results corresponding to the environmental data samples, and each of the sample reference results includes a device status and a scenario type. The preset environment classification model is strained with the environmental data samples as inputs and the sample reference results as outputs.

Whether or not the user can receive sounds produced by motor vibration may depend largely on environmental noise. Likewise, the reminding effect based on the sense of vibrations transmitted to the user by the motor varies drastically under the influence of the spatial distance when the device is in different statuses, for example, when the device is held by the user's hand or is placed in a pocket or bag. Considering the above, in one embodiment of the present disclosure, a machine learning model is used to intelligently recognize the scenario type (determine whether or not there is loud noise disturbance in the environment according to the environmental noise data) and the device status (determine the physical distance between the device and the user according to pressure data and acceleration data), so as to improve the accuracy of reminding by means of motor vibration and the delivery rate of message reminding. In addition, after the environment classification model is trained, the corresponding device status and scenario type can be automatically output according to sensor data input to the model, so that the reminding efficiency by means of motor vibration is improved.

In one specific embodiment, examples of the device status may include, among others, a status of device being held in hand, a status of device being placed flat, and a status of device being placed in a pocket. Similarly, examples of the scenario types may include, among others, a quiet environment, a normal conversation environment, a mechanical noise environment such as a kitchen or television environment, and a busy and noisy street environment.

It should be noted that since the scenario types in the present disclosure are classified mainly according to features relating to the environmental noise, in an optional embodiment, corresponding available scenario types for each device status may be identical. That is, the scenario types obtained when the mobile phone is placed flat, held in hand or placed in a pocket can all be the quiet environment or can all be the noisy street environment depending on the level of environmental noise.

At Step S1054, a first correction value and a second correction value are determined according to the target device status and the target scenario type.

Specifically, in one optional embodiment, the first correction value may correspond to the first frequency of the first vibration signal, and the second correction value may correspond to the first amplitude of the first vibration signal.

The first correction value and the second correction value are determined based on the influences of environmental noise on the audition of human ears to specific sounds. In one specific embodiment, if the device status is that the device is placed flat and the scenario type is a quiet environment, considering that the actual sound and vibrating sensation for reminding the user need not to be very large, the first correction value and the second correction value can be respectively set as 0.8 and 0.8, that is, the standard frequency and amplitude of the first vibration signal determined are both decreased correspondingly, which correspondingly decreases the vibrating sensation and sound generated by the vibration signal for reminding the user in a relatively quiet environment.

Correspondingly, when the device is placed in a pocket and the scenario type is a noisy street, the first correction value and the second correction value can be respectively set as 1.6 and 1.3, that is, the frequency and amplitude of the first vibration signal determined are increased correspondingly, which correspondingly increases the vibration sensation generated by the motor to draw much attention from the user even in the event of the large disturbance from the external environment so as to ensure that the user can receive the prompt and notification about a new message.

At Step S1056, the first vibration frequency and the first vibration amplitude of the first vibration signal are corrected according to the first correction value and the second correction value.

Specifically, the first frequency and the second amplitude can be multiplied by the first correction value and the second correction value to correct the first vibration signal.

For example, as mentioned in the previous step, when the device is placed in the pocket and the scenario type is the noisy street, the corresponding first correction value and the corresponding second correction value may be respectively set as 1.6 and 1.4, and the first vibration signal F1 before correction may be:

$$F1=3\times\sin(2\pi\times2000\times t),$$

where the corresponding first amplitude is 3, and the corresponding first frequency is 2000. After correction, the first vibration signal turns into:

$$F2=4.8\times\sin(2\pi\times2800\times t),$$

namely, the corresponding first amplitude obtained after correction is 4.8, and the corresponding first frequency obtained after correction is 2800.

At Step S1026, a target vibration signal is generated according to the first vibration signal and a preset second vibration signal, wherein the first frequency of the first vibration signal is greater than a second frequency of the second vibration signal.

Different from the motor vibration method in the related art in which there is only a single vibration signal that is usually of low-frequency (namely the preset second vibration signal), based on the common vibration mode of the motor, medium- and high-frequency vibrations are added to the original vibrations of the motor in the embodiment of the present disclosure by adding a medium- and high-frequency voltage component to the original driving voltage (for generating the low-frequency signal) of the motor to. The advantages are as follows: because the motor has a low vibration response to medium- and high-frequency signals, the added medium- and high-frequency voltage component will not significantly affect the vibrating sensation (i.e. will not affect the previous vibration reminding function). However, human ears are very sensitive to sounds generated by the medium- and high-frequency signal (namely the first vibration signal determined according to the method mentioned above). Therefore, both a vibration reminding effect and a sound reminding effect can be simultaneously realized, thereby overcoming the defect of a poor reminding effect due to failure of sensing the vibrations of the motor driven by only the single low-frequency signal in some application scenarios where the user is not in contact with the device.

Figure 6:
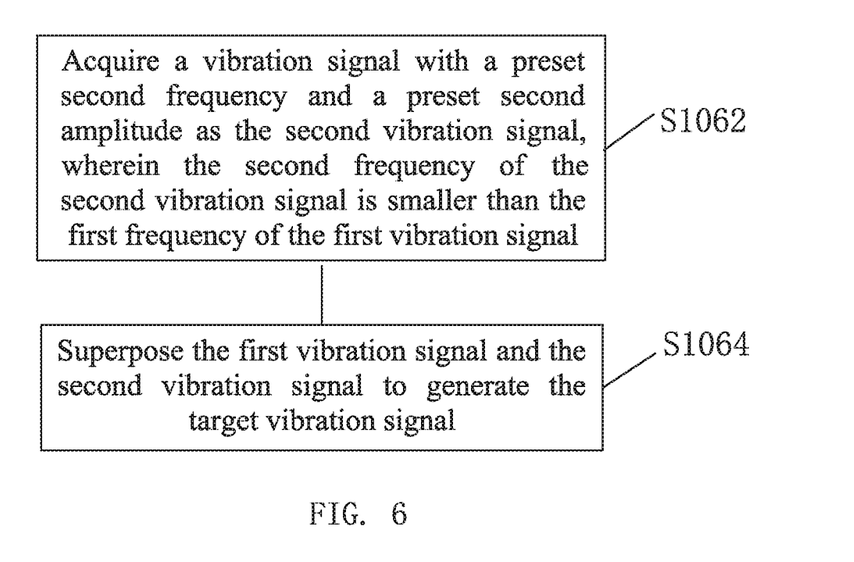
FIG. 6 is a flowchart of the process of generating a target vibration signal in the motor vibration method according to one embodiment.

This process specifically includes Steps S1062-S1064 shown in FIG. 6.

FIG. 6 is a flowchart of the process of generating the target vibration signal in the motor vibration method according to one embodiment.

At Step S1062, a vibration signal with a preset second frequency and a preset second amplitude is acquired as the second vibration signal, wherein the second frequency of the second vibration signal is smaller than the first frequency of the first vibration signal.

It should be noted that determining the second vibration signal shall not be limited to being based on the preset second frequency and second amplitude, the second vibration signal can also be determined according to requirements under specific application scenarios. For example, the second vibration signal can be determined based on the first frequency and the first amplitude of the first vibration signal determined above according to a preset value mapping relation.

At Step S1064, the first vibration signal and the second vibration signal are superposed to generate the target vibration signal.

In one specific embodiment, optionally, the first vibration signal A determined in the previous step may be A=4.8×sin(2π×2800t), (in the expression, t is the vibration time, the same below), the preset second vibration signal B may be B=2×sin(2π×500×t), and in this case, the target vibration signal C finally generated may be the sum obtained by superposing the first vibration signal and the second vibration signal, that is:

$$C=4.8\times\sin(2\pi\times2800\times t)+2\times\sin(2\pi\times500\times t)$$

At Step S1028, the motor is controlled to vibrate according to the target vibration signal.

One embodiment of the present disclosure in the application scenario that a user is reminded of a new message by motor vibrations is further explained below with reference to FIG. 7. In this application scenario, the motor used for receiving vibration instructions and the target vibration signal to realize vibrations is arranged in a mobile phone, that is, the mobile phone is used as an implementation terminal of the method in this scenario.

Figure 7:
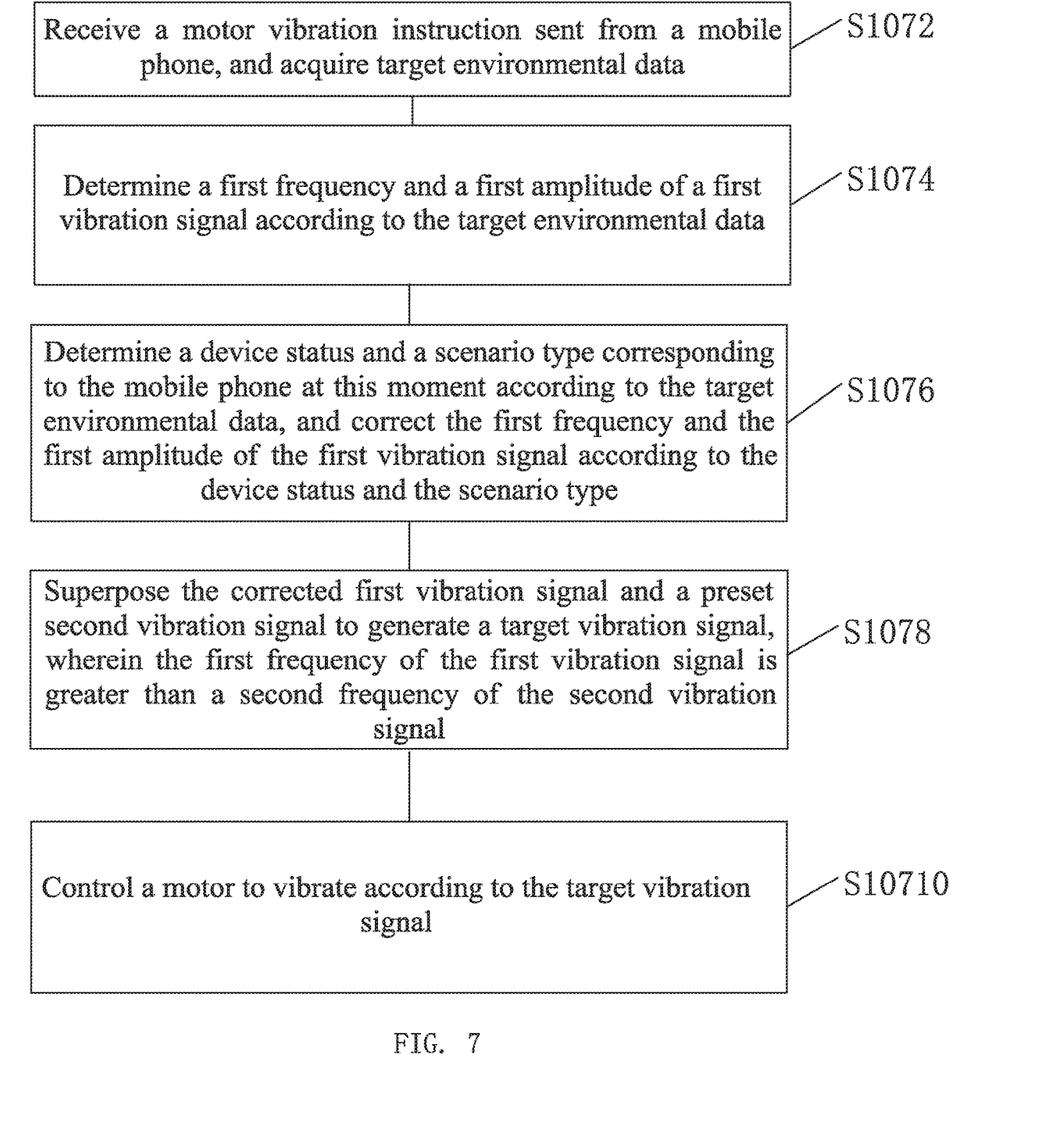
FIG. 7 is a specific flowchart of a motor vibration method in an application scenario that a user is reminded of a new message by motor vibration according to one embodiment.

FIG. 7 is a specific flowchart of the motor vibration method in the application scenario that a user is reminded of a new message by motor vibrations according to one embodiment. The specific process of the method in this application scenario may include Steps S1072-S1078, which are detailed as follows.

At Step S1072, a motor vibration instruction sent from the mobile phone is received, and target environmental data is acquired.

Specifically, when a control module of the mobile phone detects an unread message received by a chatting APP pre-installed on the mobile phone, of which the user needs to be reminded, the motor vibration instruction is then sent to the motor.

Meanwhile, pressure data, environmental noise data, and acceleration data around the mobile phone are acquired by a pressure sensor, an environmental noise sensor, and an acceleration sensor installed in the mobile phone to serve as the target environmental data.

At Step S1074, a first frequency and a first amplitude of the first vibration signal are determined according to the target environmental data.

Specifically, in this application scenario, the first frequency may be determined as follows: if it is determined, according to the environmental noise data acquired in the previous step, that the center frequency of environmental noise at this moment is within (0 Hz, 2500 Hz], the first frequency should be set to be much higher than the center frequency of environmental noise, e.g. 3000 Hz, to ensure that the first vibration signal keeps away from the environmental background noise, so that the first vibration signal can be noticed by the user.

Similarly, the first amplitude may be determined as follows: the sound pressure level corresponding to the sound pressure value of the acquired environmental noise is first determined, and the sound pressure levels of environmental noises are pre-classified as: (0 dB, 30 dB], (30 dB, 50 dB], (50 dB, 80 dB] and (80 dB, +∞) (which respectively correspond to a quiet environment, a normal conversation environment, a noisy environment such as kitchen or television environment, a busy street or even noisier environment). In this application scenario, the determined sound pressure level of the environmental noise is within (30 dB, 50 dB], the amplitude mapped out according to a preset spatial mapping relation is 4, and thus the first amplitude is set as 4.

At Step S1076, a device status and a scenario type of the mobile phone at this moment are determined according to the target environmental data, and the first frequency and the first amplitude of the first vibration signal are corrected according to the device status and the scenario type.

The target environmental data is input to a pre-trained environment classification model to obtain the device status and scenario type as output of the model. In this application scenario, the device status may be 'being placed in a pocket' and the scenario type may be the 'normal conversation environment', and a first correction value corresponding to the first frequency of the first vibration signal and a second correction value corresponding to the first amplitude may be respectively set as 1.2 and 1.3.

At Step S1078, the corrected first vibration signal and a preset second vibration signal are superposed to generate a target vibration signal, wherein the first frequency of the first vibration signal is greater than a second frequency of the second vibration signal.

If the first vibration signal obtained before correction according to the first frequency and the first amplitude determined in Step 1074 and Step S1076 is $S1=4\times(2\pi\times 3000\times t)$, and then a weighted correction is carried out on the first frequency and the first amplitude of the first vibration signal according to the first correction value (1.2) and the second correction value (1.3) to obtain the corrected first vibration signal $S2=4.8\times\sin(2\pi\times 3900\times t)$.

Meanwhile, the pre-modulated second vibration signal can be expressed as: $S3=2\times\sin(2\pi\times 500\times t)$, and the target vibration signal generated by superposing the first vibration signal and the preset second vibration signal is: $S4=S2+S3=4.8\times\sin(2\pi\times 3900\times t)+2\times\sin(2\pi\times 500\times t)$.

At Step S10710, the motor is controlled to vibrate according to the target vibration signal.

Specifically, the target vibration signal may be transmitted to the preset motor in the form of current to enable the motor to vibrate according to all parameters of the target vibration signal, so as to make sounds and generate vibrations to fulfill reminding and notification effects.

Figure 8:
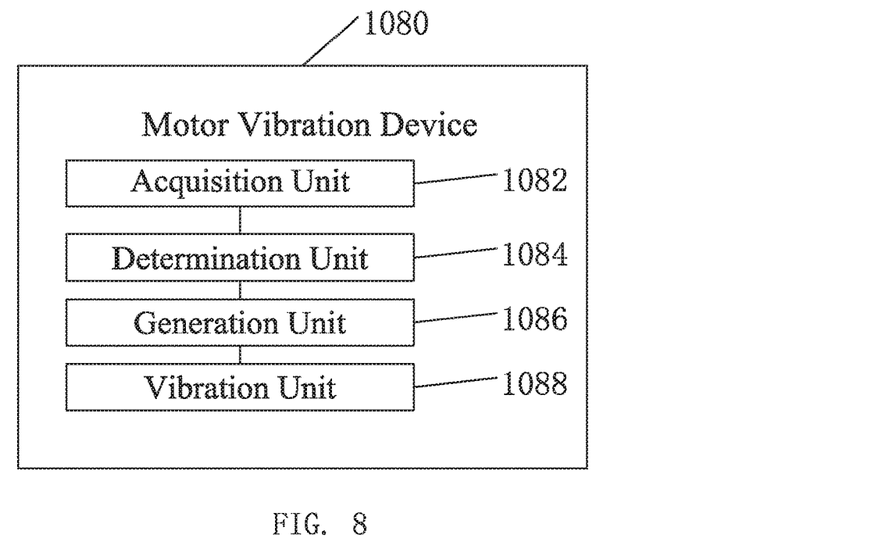
FIG. 8 is a structural block diagram of a motor vibration device according to one embodiment.

FIG. 8 is a structural block diagram of a motor vibration device according to one embodiment.

As shown in FIG. 8, a motor vibration device 1080 according to one embodiment of the present disclosure may include an acquisition unit 1082, a determination unit 1084, a generation unit 1086, and a vibration unit 1088.

The acquisition unit 1082 is configured for receiving a vibration instruction, and acquiring target environmental data by a preset sensor, wherein the target environmental data includes one or more of environmental noise data, acceleration data and/or pressure data.

The determination unit 1084 is configured for determining a first vibration signal according to the target environmental data.

The generation unit 1086 is configured for generating a target vibration signal according to the first vibration signal and a preset second vibration signal, wherein a first frequency of the first vibration signal is greater than a second frequency of the second vibration signal.

The vibration unit 1088 is configured for controlling the motor to vibrate according to the target vibration signal.

Figure 9:
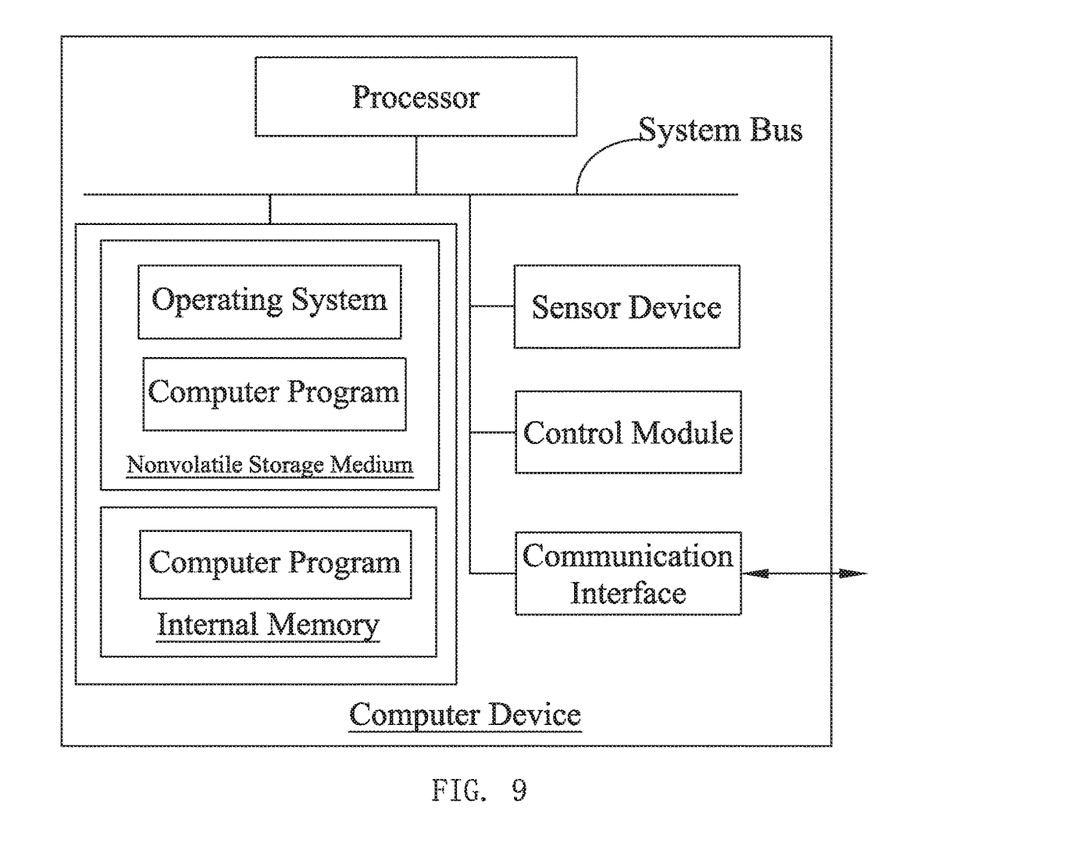
FIG. 9 is a structural block diagram of computer device according to one embodiment.

FIG. 9 is an internal structural diagram of a computer device according to one embodiment of the present disclosure. In particular, the computer device can be a terminal device or a server. As shown in FIG. 9, the computer device includes a processor, a memory, a communication interface, a sensor device, and a control module that are connected via a system bus. The memory includes a non-volatile storage medium and an internal memory. The non-volatile storage medium of the computer device stores an operating system thereon, and can also store a computer program thereon. When the computer program is executed by the processor, the processor can implement the motor vibration method disclosed herein. The internal memory can also store a computer program, and when the computer program is executed by the processor, the processor can implement the motor vibration method disclosed herein. Those skilled in the art will appreciate that the structure of FIG. 9 is illustrative rather than restrictive, and in practical application, the computer device can include more or less parts than those shown in the figures, a combination of some parts, or have parts arranged in different ways.

In one embodiment, a computer device is provided which includes a memory and a processor. A computer program is stored on the memory, and when the computer program is executed by the processor, the processor can implement the following steps:

receiving a vibration instruction, and acquiring target environmental data by a preset sensor, wherein the target environmental data includes one or more of environmental noise data, acceleration data and/or pressure data;

determining a first vibration signal according to the target environmental data;

generating a target vibration signal according to the first vibration signal and a preset second vibration signal, wherein a first frequency of the first vibration signal is greater than a second frequency of the second vibration signal; and controlling a motor to vibrate according to the target vibration signal.

In one embodiment, a computer-readable storage medium is provided. A computer program is stored on the computer-readable storage medium. Execution of the computer program by a processor enables the processor to implement the following steps:

receiving a vibration instruction, and acquiring target environmental data by a preset sensor, wherein the target environmental data includes one or more of environmental noise data, acceleration data and/or pressure data;

determining a first vibration signal according to the target environmental data;

generating a target vibration signal according to the first vibration signal and a preset second vibration signal, wherein a first frequency of the first vibration signal is greater than a second frequency of the second vibration signal; and controlling a motor to vibrate according to the target vibration signal.

As will be appreciated by people skilled in the art, all or part of the steps of the methods in the embodiments described above can be completed by hardware under the instructions of the computer program. The program can be stored in a non-volatile storage medium, and when the program is executed, the method of the embodiments described above can be implemented. Any reference to memory, storage, database or other medium used in all embodiments of the present disclosure involves non-volatile and/or volatile memories. Non-volatile memories can include read-only memory (ROM), programmable read-only memory (PROM), electrically programmable read-only memory (EPROM), electrically erasable programmable read-only memory (EEPROM), and flash memory. Volatile memories can include random access memory (RAM) or external cache memory. For purposes of illustration only, RAMs are available in various forms, such as static RAM (SRAM), dynamic RAM (DRAM), synchronous DRAM (SDRAM), double data rate SDRAM (DDRSDRAM), strengthened SDRAM (ESDRAM), synchlink DRAM (SLDRAM), rambus direct RAM (RDRAM), direct rambus dynamic RAM (DRDRAM), and rambus dynamic RAM (RDRAM), etc.

Although the disclosure is described with reference to one or more embodiments, it will be apparent to those skilled in the art that various modifications and variations can be made to the disclosed structure and method without departing from the scope or spirit of the disclosure. In view of the foregoing, it is intended that the present disclosure cover modifications and variations of this invention provided they fall within the scope of the following claims and their equivalents.

What is claimed is:

1. A motor vibration method comprising:
   receiving a vibration instruction, and acquiring target environmental data by a preset sensor, wherein the target environmental data includes one or more of environmental noise data, acceleration data and/or pressure data;
   determining a first vibration signal according to the target environmental data;
   generating a target vibration signal according to the first vibration signal and a preset second vibration signal, wherein a first frequency of the first vibration signal is greater than a second frequency of the second vibration signal;
   controlling the motor to vibrate according to the target vibration signal;
   wherein determining the first vibration signal according to the target environmental data comprises:
   extracting environmental noise spectral features from the environmental noise data;
   determining an environmental noise center frequency corresponding to the environmental noise data according to the environmental noise spectral features; and
   determining a vibration frequency corresponding to the environmental noise center frequency as the first frequency of the first vibration signal according to a preset mapping relation between noise frequencies and vibration frequencies.

2. The motor vibration method according to claim 1, wherein determining the first vibration signal according to the target environmental data comprises:
   acquiring an environmental noise sound pressure value in the environmental noise data;
   determining an environmental noise sound pressure level corresponding to the environmental noise sound pressure value; and
   determining a signal amplitude corresponding to the environmental noise sound pressure level as a first amplitude of the first vibration signal according to a preset mapping relation between noise sound pressure levels and signal amplitudes.

3. The motor vibration method according to claim 1, wherein determining the first vibration signal according to the target environmental data comprises:
   acquiring an environmental noise sound pressure value in the environmental noise data;
   determining an environmental noise sound pressure level corresponding to the environmental noise sound pressure value; and
   determining a signal amplitude corresponding to the environmental noise sound pressure level as a first amplitude of the first vibration signal according to a preset mapping relation between noise sound pressure levels and signal amplitudes.

4. The motor vibration method according to claim 1, wherein determining the first vibration signal according to the target environmental data comprises:
   inputting the target environmental data into a preset environment classification model to acquire a target device status and a target scenario type as outputs of the environment classification model; and
   correcting the first vibration signal according to the target device status and the target scenario type.

5. The motor vibration method according to claim 4, wherein correcting the first vibration signal according to the target device status and the target scenario type comprises:
   determining a first correction value and a second correction value according to the target device status and the target scenario type; and
   correcting a first vibration frequency and a first amplitude of the first vibration signal according to the first correction value and the second correction value.

6. The motor vibration method according to claim 1, wherein determining the target vibration signal according to the first vibration signal and the preset second vibration signal comprises:
   acquiring a vibration signal with a preset second frequency and a preset second amplitude to serve as the second vibration signal; and
   superposing the first vibration signal and the second vibration signal to generate the target vibration signal.

7. The motor vibration method according to claim 1, further comprising:
   determining a sample set, wherein the sample set includes multiple environmental data samples and sample reference results corresponding to the environmental data samples, and each of the sample reference results includes a device status and/or a scenario type; and
   training a preset environment classification model with the environmental data samples as inputs and the sample reference results as outputs.

* * * * *